Patented Jan. 12, 1937

2,067,616

UNITED STATES PATENT OFFICE 2,067,616

PROCESS FOR THE SYNTHESIS OF OLEFINE DERIVATIVES

Richard Z. Moravec, Berkeley, Calif., assignor to Shell Development Company, San Francisco, Calif., a corporation of Delaware No Drawing. Application March 5, 1935,
Serial No. 9,386

20 Claims. (Cl. 260—156)

This invention relates to the production of valuable derivatives of olefines such as ethers, esters and, particularly, alcohols, by contact with mineral-acting acid compounds.

Known methods for producing olefine derivatives by means of aqueous mineral-acting acid compounds may be divided into two general classes. First, processes in which the acid functions as a true catalyst and the reaction product is distilled off as fast as formed, and second, those methods which depend upon the formation of reaction or absorption products between the olefine and the acid which must subsequently be recovered from the absorption medium or "acid liquor" either unchanged or in a converted form.

The first, or catalytic, method of treatment have never proven commercially feasible because of the unfavorable equilibrium conditions which exist at the high temperatures which are required by all the known acid-acting catalysts and/or the superatmospheric pressure systems necessary. The second, or indirect, processes, particularly those involving the intermediate formation of "acid liquids" have, on the other hand, met with considerable success in spite of the fact that the large quantities of acid consumed per mol. of product produced by such treatments greatly increase the final cost of the finished product.

I have now found that the indirect processes may be so modified that all the advantages of low acid consumption, etc., of true catalytic methods may be obtained without recourse to the high temperatures and consequent unfavorable equilibrium conditions inherent in the latter and/or without recourse to dangerous and expensive, as well as complicated, high pressure systems. My new process has the further advantage of greatly improving the selectivity of the reaction when mixtures of olefines of different reactivity toward mineral-acting acid compounds are used and, furthermore, avoids undesirable side reactions, such as olefine polymerization, and the like, to an extent not heretofore possible.

My invention may be practiced with any suitable olefine or olefinic mixture regardless of the source or character of its olefine content. As suitable starting material, hydrocarbons derived from mineral oils as petroleum, shale oil, and the like, or from mineral oil products, or from natural gas, or from coal, peat and like carboniferous natural material, may be used as well as those derived from animal and vegetable oils, fats and waxes. The olefines present in such starting material may be of natural occurrence, the result of a dehydrogenation, distillation, vapor or liquid phase cracking, or other pyrogenetic treatment. The olefines may be used in a pure state, either as individual olefines or pure olefinic mixtures, or in admixture with paraffins or other compounds which may be considered as inert in the process. Furthermore, such olefines may comprise hydrocarbon fractions consisting of, or predominating in, hydrocarbons containing the same number of carbon atoms to the molecule, or of mixtures of non-isomeric hydrocarbons. Ethylene and/or secondary-base olefines (i. e. olefines, both iso and normal, which yield secondary derivatives, as propylene, butene-1, butene-2, $\alpha$ and $\beta$ amylene, isopropyl ethylene, and the like) and/or tertiary-base olefines (i. e. iso-olefines which yield tertiary derivatives as isobutylene, trimethyl ethylene, 1,1 methyl ethyl ethylene, and higher homologues and analogues) may thus be used.

Suitable mineral acid-acting compounds which may be used in my process are: inorganic acids, of which dithionic, sulfuric, phosphoric and pyrophosphoric are typical, or organic acids as benzene sulfonic, naphthalene sulfonic, p-toluene sulfonic and homologues and analogues, and the like, or "acid liquors" such as are obtained by the absorption of olefines in mineral-acting acids such as the above: or acid-acting salts, such, for example as sodium bisulfate, etc.

The process of my invention comprises reacting an olefine, or olefines, with a mineral-acting acid solution of a substantially constant free acid to water ratio or range with or without hydrolyzing the reaction product under conditions such as this or another definite ratio is maintained. The resulting olefine derivative, for example an alcohol, is then separated and the acid set free by the hydrolysis may be re-used for a repetition of the cycle. This method of operation involves two radical departures from prior practice. First, the maintenance of a substantially constant free acid concentration, defined as the ratio of free acid to free acid plus water, during the absorption operation, in contrast with former methods in which this value was permitted to vary progressively as a result of the consumption of acid and/or water in the absorption reaction. Second, the regulation of the free acid concentration during the hydrolysis treatment so that the customary excessive dilution at this stage is avoided, with the result that no material reconcentration or other regeneration treatment, except separation of the olefine hydrolysis product, is necessary in order that the acid may be used again for the absorption of more olefine.

My invention may be carried out in many different ways. The olefine absorption may, for example, be carried out with the olefine or olefines in the liquid, gaseous or vaporous phase. The absorption may be effected at any desired pressure. With olefines in the gaseous or vaporous phase, superatmospheric pressures are particularly advantageous as the absorption rate is thereby increased. Preferably, however, the olefinic starting material is used in the liquid state as more intimate contact between the reagents is promoted thereby. But, in any case, the conditions of temperature and pressure in my process will be such that the olefine derivative produced will not be substantially vaporized during the absorption operation. Either continuous, intermittent, or batch methods of operation may be employed.

The free acid concentration to be used in any particular case will depend upon the nature of the acid-acting compound and olefine or olefines employed, the concentration of the olefine or olefines used, and the temperature at which the reaction is carried out. When the mineral acting-acid used is sulfuric acid, I have found that ratios of free acid to free acid plus water, i. e.

$$\frac{H_2SO_4}{H_2SO_4+H_2O}$$

within the range of 0.5 to about 0.98, by weight, may be used. For tertiary base olefines ratios of about 0.6 to about 0.8 are preferable, while for secondary base olefines ratios of about 0.8 to about 0.95 are more suitable. These ratios have been chosen because they give practical olefine absorption rates while providing sufficient water to enable the subsequent hydrolysis of the absorption product to proceed to form, for example, alcohol.

In order to maintain the free acid concentration within the desired limits during the absorption of the olefine or olefines, I have found that some water must usually be added in order to prevent concentration of the free acid. Such concentration results from the removal of water as alcohol formed during the absorption. The amount of water so removed, and consequently the amount of water which must be added to maintain a constant free acidity, varies with different olefines. With tertiary base olefines the hydrolysis rate is relatively high, under conditions at which absorption takes place, compared with other olefines, and consequently relatively large amounts of water should be added during the absorption. Ethylene, on the other hand, is only slightly, if at all, hydrolyzed under the usual conditions of its absorption and frequently acid, instead of water addition, during absorption is necessary in this case. Secondary base olefines occupy a position intermediate between these extremes and may require, for the maintenance of a free acid concentration within the desired limits the addition of either acid or water during absorption depending upon the conditions under which the absorption is carried out. For example, when the secondary olefine is present in the absorption mixture in molecular excess over the acid-acting compound or compounds present, the formation of neutral alkyl esters is favored. Under these conditions, there is little tendency for hydrolysis of the neutral alkyl esters to occur, and the addition of acid may, therefore, be required to prevent the free acid concentration from falling and the absorption rate from being reduced. On the other hand, where the primary product of the absorption is an alkyl acid ester or esters, appreciable hydrolysis thereof may take place and require the addition of water during the absorption to prevent the free acid concentration from rising and the absorption from losing its selectivity and/or leading to other undesirable side-reactions. It is possible to carry out the absorption in such a manner that these two factors just balance each other, that is, the neutral alkyl esters formed are just equivalent to the alkyl acid esters hydrolyzed so the free acid concentration remains constant. Since the conversion of neutral esters to other products is generally more difficult than is the case with alkyl acid esters, I prefer to carry out the olefine absorption under conditions which do not favor neutral ester formation, and therefore usually find it advisable to add water during the absorption of secondary base olefines for the maintenance of a free acid concentration within the desired limits.

It is not necessary, or usually advisable, that the olefine and water be added to the absorption unit in equi-molal proportions, or even in strict proportion to the alcohol formed during the absorption, since there will be a small, but steady, loss of water in any immiscible hydrocarbons separated at this stage of treatment. The most reliable method of determining the water addition is, therefore, from analyses of the reactor's contents. When operating conditions are stable, however, the addition found suitable may be continued without further analyses.

The water used to maintain the ratio of free acid to free acid plus water during the absorption, may be in the form of vapor, or in the liquid phase, or, when it is desirable to simultaneously cool the reaction mixture, in the form of ice. The water may be initially, partly or wholly, present in the olefine or olefines used or may be added thereto prior to the absorption. Alternatively, the water may be added to the absorption medium separately from the olefine or olefines added. The mode of addition may be varied in any suitable manner to meet the conditions imposed by the apparatus used and the operating conditions chosen. Thus, where the absorption is carried out, counter-currently, in towers, or the like, through which the acid medium is circulated, the water may be continually admitted, in the required amount, at any convenient point in the system. With batch methods of operation, on the other hand, as, for example where the olefine or olefines to be absorbed are agitated with an acid solution in a closed vessel, the water may more conveniently be added intermittently, in small amounts, as the acid concentration approaches the predetermined upper limit chosen.

The conditions which should be maintained in any subsequent hydrolysis treatment will vary, depending upon the character of the olefine used in the preparation of the olefine absorption product. With tertiary-base olefines a separate operation may not be required since the hydrolysis which takes place during absorption is usually quite extensive, but with ethylene and/or secondary base olefines a subsequent hydrolysis treatment may be advantageous, although not always necessary, since the hydrolysis which takes place during the absorption may be relied upon as the sole source of alcohol. Where a separate hydrolysis step is resorted to, the reaction is preferably carried out with only sufficient water to effect the desired conversion of alkyl mineral-acting acid and/or neutral ester, so that, on completion of the operation, the free acid concentration, as above defined, is in the desired range for further olefine absorption. Only removal of the alcohol so produced is then necessary in order for the acid to be in condition for a repetition of the cycle.

The water added during the hydrolysis treatment may advantageously be admitted, either continuously or intermittently, during the operation. In general, I prefer to avoid adding all the water required for hydrolysis at the start of the operation if excessive dilution, which would greatly retard the hydrolysis in its early stages, would result therefrom. This procedure is not always objectionable, however, particularly where temperature or other conditions which promote rapid hydrolysis, are employed. It is not necessary, or always desirable that the hydrolysis be carried to completion. In fact, at the high free acid concentration, which I prefer to maintain throughout the hydrolysis and which always exists, in my preferred method of operation, at the end of this treatment, equilibrium conditions are such that some alkyl esters of the mineral acting acid used will usually be present, unless tertiary base olefines alone are involved, or provision has been made for removal of the olefine hydrolysis product during the hydrolysis. In continuous methods of operation especially, it is usually more economical to re-circulate with the free acid some unhydrolyzed esters thereof, rather than prolong the hydrolysis treatment until the equilibrium condition is attained.

It is desirable in this feature of my invention, however, that the hydrolysis be carried out, in relation to the water added, to such an extent that the hydrolyzed product, after removal of the olefine derivative formed, is capable of reuse in the absorption stage of the process. More preferably, the free acid concentration should be within the desired limits previously referred to. The attainment of this end is facilitated by the continuous or intermittent addition of the water for hydrolysis which not only aids operating control, but also accelerates the reaction by providing a higher average acidity.

The hydrolysis may be carried out in any convenient apparatus at any desired pressure and temperature. These conditions should preferably be adapted to the free acid concentration used and the nature of the olefine or olefines involved so that back decomposition to olefines and other undesirable side reactions are minimized.

In the subsequent separation of the olefine derivative or derivatives from the hydrolyzed absorption product, precautions should be taken to avoid undesirable decomposition of the product. Suitable methods for recovering the olefine derivatives produced include: extraction with suitable solvents, vacuum or other low temperature distillation treatment, flash distillation, and the like. The specific method adopted in any individual case will, of course, depend upon the nature of the olefine product involved and the composition of the hydrolyzed mixture being treated, which latter, as has been pointed out above, may vary widely not only with a particular olefine, but even more with different olefines.

In some cases it may be advantageous to carry out the recovery operation together with the hydrolysis step. Water may be added to the absorption product and the diluted mixture steam distilled, for example. Under these conditions, it may be desirable to add water during the distillation to prevent concentration of the free acid which might lead to the formation of polymers and other undesirable reactions.

The following examples illustrate specific applications of my invention as used for the manufacture of tertiary and secondary butyl alcohol. It will be understood, however, that I am not to be limited thereto, as many other applications and modifications are possible without departing from the spirit of my invention.

*Example I*

In one simple batch method of carrying out the invention 50 grams of 75% sulfuric acid diluted with 56.5 grams of anhydrous tertiary butyl alcohol, were used as the absorption medium for isobutylene. To this were added varying amounts of a substantially pure butane-butene mixture containing about 33% isobutylene, and varying amounts of water. The proportions in which these reagents were added were adjusted so that the weight ratio of free $H_2SO_4$ to free $H_2SO_4$ plus water present in the absorption medium was maintained substantially constant in the range of about 0.7 to about 0.75.

After each addition of reagents, the mixture was agitated, under pressure, for about half an hour at about 95 to about 110° F. and then allowed to stratify while being cooled to about 20 to 25° F. The upper layer containing unabsorbed hydrocarbons, tertiary butyl alcohol and some water and very small amounts of sulfuric acid was separated from the lower layer composed of aqueous sulfuric acid, tertiary butyl alcohol and a small amount of dissolved hydrocarbons. The upper layer was distilled at atmospheric pressure, the gaseous hydrocarbons driven into the air and the tertiary butyl alcohol recovered as a constant boiling mixture with water. This procedure was repeated six times. The results obtained were as follows:

Start: Sulfuric acid _____ 37.5 grams
Water _____ 12.5 grams
Tertiary butyl alcohol ___ 56.5 grams Weight ratio $\dfrac{\text{Free } H_2SO_4}{\text{Free } H_2SO_4 + H_2O} = .75$

| Number of absorption cycle | Water added | Isobutylene added | Alcohol recovered from hydrocarbon layer | Weight ratio $\dfrac{\text{Free } H_2SO_4}{\text{Free } H_2SO_4 + H_2O}$ (after absorption) |
|---|---|---|---|---|
| 1 | 3.6 gms. | 11.7 gms | 7.7 gms. | .74 |
| 2 | 3.6 " | 16.6 " | 10.3 " | .76 |
| 3 | 6.5 " | 16.6 " | 11.5 " | .74 |
| 4 | 6.5 " | 16.6 " | 12.7 " | .72 |
| 5 | 6.5 " | 16.6 " | 10.1 " | .69 |
| 6 | None | 16.6 " | 11.3 " | .76 |
| Totals | 26.7 gms. | 94.7 gms. | 62.6 gms. | |

End: The acid layer contained:

Sulfuric acid _____ 36.3 grams
Tertiary butyl alcohol (anhydrous) _ 73.0 grams
Total alcohol produced = 79.1 grams
Isobutylene charged = 94.7 grams
Sulfuric acid lost = 1.2 grams
Yield of tertiary butyl alcohol = 62.8% of theoretical based on isobutylene input.

No secondary alcohols could be detected in the product, nor were any polymers found.

*Example II*

As starting material for the preparation of tertiary butyl alcohol, in one typical instance, 1922 gallons of a butane-butylene fraction having the following approximate composition were used.

| | Per cent by volume |
|---|---|
| Paraffin hydrocarbons | 43.2 |
| Butene 1 and butene 2 | 28.8 |
| Iso-butylene | 28.0 |

This hydrocarbon mixture was fed, in the liquid state, at a rate of 214 gallons per hour, to a continuous reactor which had been charged with 90% sulfuric acid. The reactor was provided with agitating means and with cooling coils through which a refrigerant was circulated to maintain a reaction temperature of about 100° to 115° F. It will be obvious that the temperature used may be varied in accordance with the free acid concentration maintained, the time of contact permitted the reagents, and like well-recognized factors.

Water was simultaneously fed to the reactor at a variable rate as was needed to maintain therein a ratio of free sulfuric acid to free sulfuric acid plus water $$\frac{H_2SO_4 \text{ by weight}}{H_2SO_4 + H_2O}$$

of about 0.7 to 0.85. In this particular run the ratio at the start was found to be 0.95. An increase in water feed lowered it to 0.81; a later sample showed a ratio of 0.71 so the water feed was decreased and the ratio brought up to 0.87. Subsequent adjustments involved relatively smaller changes and the ratio remained thereafter within the range of 0.75 and 0.85. No attempt was made to measure the water added.

Hydrocarbons and acid solution were continuously withdrawn from the reactor, an average time of contact therein of about 15 minutes being allowed. The mixture withdrawn was allowed to stratify in a separator and the aqueous acid layer drawn off and returned to the reactor, while the hydrocarbon layer, containing about 10% by volume of tertiary butyl alcohol, after the operating conditions had become stabilized, was distilled and a total of 172 gallons of anhydrous tertiary butyl alcohol, substantially free from secondary butyl alcohol, was obtained. In previous methods of tertiary butyl alcohol manufacture, in which no provision is made for maintaining the free acid concentration within the necessary limits, detectable amounts of methyl ethyl carbinol are always present in the reaction product, when starting material similar to that used here is employed.

A modification of the above procedure which has been found to offer certain advantages comprises the recovery of alcohol from both the acid and hydrocarbon layers. Thus the alcohol is completely removed from the hydrocarbon layer by distillation and/or water-washing as above described. At the same time, alcohol is flashed off in an evaporator or still from a part of the acid layer. The sulfuric acid discharged by such an evaporator may be of about 20–30% acidity, for example, and this may be recycled to the absorption unit as the source of water for reaction with the iso-butylene therein. In order that the ratio of free acid to free acid plus water in the absorption unit may be maintained within the desired limits, it will be clear that no more of the acid layer may be withdrawn to the flash evaporator than will correspond in water content after distillation to the water which would otherwise be added during absorption, unless acid is to be discarded or reconcentrated. Thus the less the acid is diluted during the recovery of alcohol therefrom, the larger the proportion of the total which may be withdrawn for flash evaporation.

Example III 1.0 gram mol. of secondary butenes was absorbed at about 70° F. by shaking with an 84.6% sulfuric acid solution representing 1.0 gram mol. of $H_2SO_4$. The resulting absorption product had the following approximate composition:

| | Mols. |
|---|---|
| $C_4H_{10}SO_4$ | 0.471 |
| $H_2O$ | 0.472 |
| $H_2SO_4$ | 0.529 |
| $C_4H_9OH$ | 0.529 |

The ratio of free sulfuric acid to free sulfuric acid plus water in this product is thus 0.86 (by weight) or practically the same as the starting ratio of 0.846.

To this absorption product (minus small amounts removed as samples for analysis) 8.5 grams (0.472 gram mols) of water were added and the mixture subjected to an hydrolysis treatment of about six hours at 70° F. It was then found that the composition of the hydrolyzed product was approximately as follows:

| | Mols. |
|---|---|
| $C_4H_{10}SO_4$ | 0.358 |
| $H_2O$ | 0.829 |
| $H_2SO_4$ | 0.642 |
| $C_4H_9OH$ | 0.642 |

Where the weight ratio $$\frac{H_2SO_4}{H_2SO_4 + H_2O} = 0.81$$

To the product thus hydrolyzed with an amount of water such that the ratio $$\frac{H_2SO_4}{H_2SO_4 + H_2O}$$

at the end of the hydrolysis is within the range required for further olefine absorption were added 26.4 grams (0.471 gram mols) of secondary butenes. After intermittent shaking to obtain substantial equilibrium the composition of the new absorption product was found to be approximately:

| | Mols. |
|---|---|
| $C_4H_{10}SO_4$ | 0.553 |
| $H_2O$ | 0.551 |
| $H_2SO_4$ | 0.441 |
| $C_4H_9OH$ | 0.991 |

The weight ratio of free sulfuric acid to free sulfuric acid plus water is here 0.814.

Examples I and II illustrate the special advantage of my process of maintaining a substantially constant free acid concentration throughout the absorption where an olefine is to be selectively absorbed from admixture with another olefine or olefines of different reactivity toward the acid used. The free acid concentration, in such cases, may be allowed to vary within certain limits depending upon the relative activities of the olefines involved, it being only necessary to operate within such a range that, under the conditions obtaining, one olefine or certain olefines are absorbed by the acid which remains incapable of absorbing substantial quantities of other olefines present in the mixture. In the preferential absorption of propylene in the presence of ethylene, for example, a wider range of variation may be permitted the free acid concentration than is desirable in the separation of tri-methyl-ethylene and/or methyl-ethyl-ethylene from pentene-1 and/or pentene-2.

My process is equally advantageous in the treatment of pure olefines or hydrocarbon mixtures containing only one olefine, or olefinic mixtures of substantially the same reactivity toward the acid used. When my invention is applied in such cases, polymerization and other undesirable side reactions which result from the presence of strong acid due to the concentration effected by removal of water during the absorption, are completely avoided.

This feature of my invention, namely the maintenance of a controlled ratio of free acid to free acid plus water, is applicable to any olefine absorption process, with great advantage, regardless of the subsequent treatment accorded the absorption product, and it will be understood that such procedure is within the province of my invention independently of the subsequent steps of hydrolyzing and recovering the desired product from an acid liquor containing free acid of olefine absorptive capacity illustrated by Example II. It is only in combination with the latter, however, that the full advantages of both methods of treatment, and particularly high acid economy, may be realized.

Another advantage of my process, also illustrated by Examples I and II, is that by maintaining a controlled ratio of free acid to free acid plus water throughout the absorption process, acid concentrations higher than those formerly considered optimum may be used and correspondingly improved reaction rates may be realized. Thus, prior workers have generally agreed that isobutylene is best absorbed in sulfuric acid of about 50 to 65% strength under temperature conditions comparable with those used in Examples I and II where 70 to 90% sulfuric acid solutions were used without encountering appreciable polymerization or other undesirable side reactions.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. In a process for producing an olefine derivative, the step of absorbing an olefine in a liquid mineral acid-acting medium at a temperature and pressure whereat the olefine absorption product is substantially in the liquid phase, while maintaining in said absorption medium a substantially constant ratio or range of free acid to free acid plus water of at least about 0.5.

2. In a process for producing an olefine derivative, the step of absorbing an olefine in a liquid mineral acid-acting medium at a temperature not substantially above about 115° F. and pressure whereat the olefine absorption product is substantially in the liquid phase, while adding water to said absorption medium in the amount required to maintain therein a substantially constant ratio or range of free acid to free acid plus water.

3. In a process for producing an olefine derivative, the step of absorbing and retaining in the liquid phase an olefine in a mineral acid while maintaining in the latter a substantially constant ratio or range of free acid to free acid plus water of at least about 0.5.

4. In a process for producing a tertiary-base olefine derivative, the step of absorbing a tertiary-base olefine in a liquid mineral acid-acting medium at a temperature and pressure whereat said tertiary-base olefine absorption product is substantially in the liquid phase, while adding water to said absorption medium in the amount required to maintain therein a substantially constant ratio or range of free acid to free acid plus water of at least about 0.5.

5. In a process for producing a secondary-base olefine derivative, the step of absorbing a secondary-base olefine in a liquid mineral acid-acting medium at a temperature and pressure whereat the absorbed olefine is substantially converted to an alkyl ester of the acid present in said medium, while maintaining in said absorption medium a substantially constant ratio or range of free acid to free acid plus water of at least about 0.5.

6. In a process for producing tertiary butyl alcohol, the step of absorbing isobutylene in a liquid mineral acid-acting medium at a temperature and pressure whereat tertiary butyl alcohol is substantially in the liquid phase while maintaining in said absorption medium a substantially constant ratio or range of free acid to free acid plus water of at least about 0.5.

7. In a process of producing an olefine derivative from mixed olefines of different reactivities, the step of absorbing the more reactive olefinic constituents of said mixture in a liquid mineral acid-acting medium at a temperature and pressure whereat the olefine absorption product is substantially in the liquid phase while maintaining in said absorption medium a ratio of free acid to free acid plus water of at least about 0.5 and within a range in which the less reactive olefinic constituents of the starting mixture are incapable of substantial absorption.

8. In a process for selectively absorbing an olefine from admixture with an isomeric olefine of different reactivity toward the acid absorption medium used, the step of contacting said olefinic mixture at a temperature not substantially above 115° F. with said acid medium while adding water to the latter to maintain therein a ratio of free acid to free acid plus water within a range in which said acid medium absorbs and retains in the liquid phase the more reactive of the olefines present while remaining incapable of absorbing substantial quantities of other olefines present in said olefinic mixture.

9. In a process for producing a tertiary-base olefine derivative from a mixture comprising tertiary and secondary base olefines, the step of separating at least a part of the tertiary-base olefinic content of said mixture from the other components thereof by absorption in an acid-acting medium while adding water thereto to maintain therein a ratio of free acid to free acid plus water of at least about 0.5 and within a range in which said acid-acting medium absorbs and retains in the liquid phase said tertiary-base olefine while remaining incapable of absorbing substantial quantities of the secondary-base olefines present.

10. In a process for producing a tertiary alcohol, the step of absorbing a tertiary-base olefine in a mineral acid solution of high acid concentration at a temperature not substantially above 115° F. while adding water to said acid solution in the amount required to prevent substantial polymerization of said olefine.

11. In a process for producing an olefine derivative, the step of absorbing an olefine in a sulfuric acid solution at a temperature and pressure whereat the olefine absorption product is substantially in the liquid phase while maintaining in said solution a substantially constant ratio or range of free sulfuric acid to water of at least about 0.5.

12. The process of producing a secondary-base olefine derivative which comprises absorbing a secondary-base olefine in a liquid mineral acid-acting medium at a temperature and pressure whereat the absorbed olefine is substantially converted to an alkyl ester of the acid present in said medium while maintaining in said absorption medium a substantially constant ratio or range of free acid to free acid plus water of at least about 0.5, and hydrolyzing the resulting absorption product with an amount of water such that the ratio of free acid to free acid plus water at the end of the hydrolysis treatment is within a range in which said acid-acting medium is an effective olefine absorbent.

13. In a process of producing a secondary-base olefine derivative by absorption of a secondary-base olefine in a liquid mineral acid-acting medium at a temperature not substantially above about 115° F. and pressure whereat the absorbed olefine is substantially converted to an alkyl ester of the acid present in said medium, the step of hydrolyzing said alkyl ester containing absorption product with an amount of water such that the ratio of free acid to free acid plus water at the end of the hydrolysis treatment is within a range in which said acid-acting medium is an effective olefine absorbent.

14. In a process of producing a secondary-base olefine derivative by absorption of a secondary-base olefine in a liquid mineral acid-acting medium at a temperature and pressure whereat the absorbed olefine is substantially converted to an alkyl ester of the acid present in said medium, the step of hydrolyzing said alkyl ester containing absorption product while adding water thereto at a rate such that there is maintained therein a ratio of free acid to free acid plus water of at least about 0.5.

15. In a process of producing an olefine derivative by absorption of an olefine in a liquid mineral acid-acting medium at a temperature and pressure whereat the olefine absorption product is substantially in the liquid phase, the step of hydrolyzing the absorption product with an amount of water such that the weight ratio of free acid to free acid plus water therein at the end of the hydrolysis is within the range of about 0.5 to about 0.98.

16. The process of producing an olefine derivative which comprises absorbing an olefine in a liquid mineral acid-acting medium while maintaining in said absorption medium a substantially constant ratio or range of free acid to free acid plus water, and extracting from the substantially undiluted absorption product at least a part of the olefine derivative produced by means of a hydrocarbon solvent therefor which is substantially immiscible with said absorption product.

17. The process of producing a tertiary alcohol which comprises absorbing and simultaneously hydrating the corresponding olefine in an acid-acting medium while maintaining in said absorption medium a substantially constant ratio or range of free acid to free acid plus water, and extracting from the substantially undiluted absorption product at least a part of the tertiary alcohol formed by means of a hydrocarbon solvent for said alcohol which is substantially immiscible with said absorption product.

18. The process of producing an olefine derivative which comprises absorbing an olefine in a liquid mineral acid-acting medium at a temperature not substantially above about 115° F. and pressure whereat the olefine absorption product is substantially in the liquid phase, while maintaining in said absorption medium a substantially constant ratio or range of free acid to free acid plus water, separating therefrom at least a part of the olefine derivative formed and recycling the remaining absorption medium to the absorption unit.

19. The process of producing an olefine derivative which comprises absorbing an olefine in a liquid mineral acid-acting absorption medium at a temperature not substantially above about 115° F. and pressure whereat the olefine absorption product is substantially in the liquid phase, while maintaining in said absorption medium a substantially constant ratio or range of free acid to free acid plus water of at least about 0.5, hydrolyzing the resulting absorption product and recycling at least a part of the hydrolyzed product to the absorption unit.

20. The process of producing an olefine derivative which comprises absorbing an olefine in a liquid mineral acid-acting absorption medium at a temperature and pressure whereat the olefine absorption product is substantially in the liquid phase, while maintaining in said absorption medium a substantially constant ratio or range of free acid to free acid plus water of at least about 0.5, diluting and recovering an olefine derivative from a part of the absorption product and returning the remaining diluted absorption medium to the absorption unit together with the undiluted portion thereof.

RICHARD Z. MORAVEC.